3,317,954
APPARATUS FOR PRODUCING FIBERS
Thomas E. Crompton, Cary, N.C., assignor to Monsanto Company, St. Louis, Mo., a corporation of Delaware
Filed June 16, 1965, Ser. No. 464,411
9 Claims. (Cl. 18—2.6)

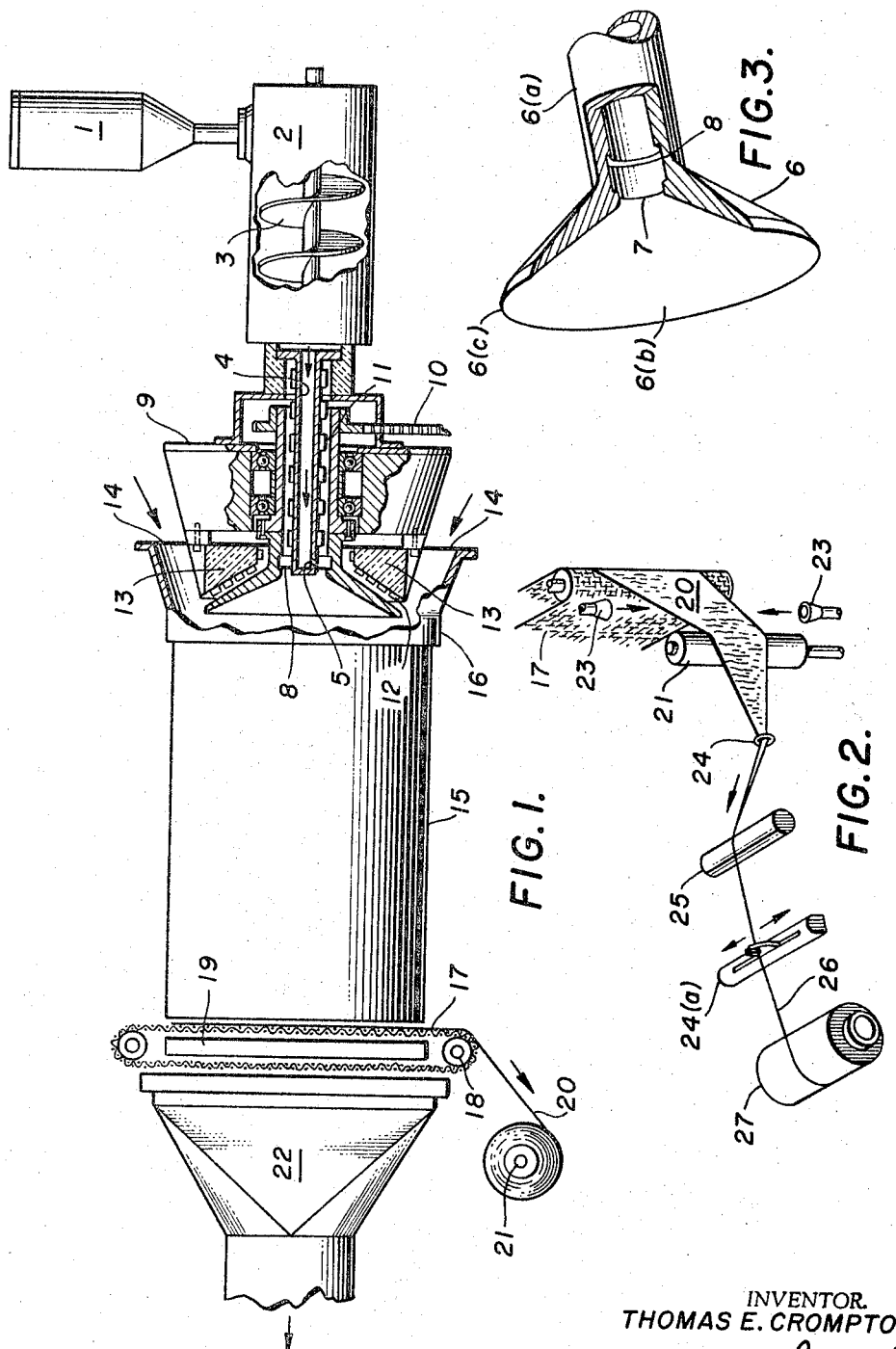

This invention relates to the production of fibers. More particularly, this invention relates to apparatus for the production of fine fibers of a synthetic organic polymer.

Heretofore, fine fibers of synthetic organic polymers have been made by processes which involve the action of a high velocity jet of gas on a molten stream of a polymeric material. In accordance with these known processes, a molten polymer stream is extruded through one or more orifices into a gas stream of high velocity. The gas stream acts to break up the polymer stream into small particles which solidify and are carried away by the gas stream. While these processes have been successful to some extent, a major problem encountered is the lack of uniformity in the shape and size of the fibers produced. When the gas stream acts on the molten polymer stream, the particle forms vary greatly in size. Furthermore, when these particles are solidified, globules or beads are formed along with the fibers due in part to the difference in size and also due to the fact that some solidification occurs as a gas stream contacts the molten polymer, that is, before the polymer attenuates into a fiber form. Furthermore, when a gas stream is passed in the area of the nozzle extruding the molten polymer, exposure of the molten polymer to the unheated atmosphere will cause some solidification to occur in the area of the nozzle. This in turn causes a build-up of solid polymer around the nozzle which eventually results in clogging of the orifices through which the molten polymer is extruded. The operation will then have to be halted until the nozzle is cleaned of polymer deposits.

It is therefore an object of this invention to provide apparatus for the production of uniform fine fibers of a synthetic organic polymer.

It is a further object of this invention to provide apparatus for the production of uniform fine fibers of synthetic organic polymers from a molten polymer.

It is a further object of this invention is provide apparatus for the production of uniform fine fibers of synthetic organic polymers which virtually eliminates bead or globule formation.

Other objects will become apparent from the following description.

The invention will be more fully understood with reference to the accompanying drawings in which:

FIGURE 1 is a perspective view of the fiber-forming apparatus of this invention;

FIGURE 2 is a perspective view of a form of apparatus used to collect the fibers formed by the present invention;

And FIGURE 3 is a view of a cone-shaped disc which is a preferred portion of the apparatus of the present invention.

There is shown in FIGURE 1 a typical arrangement of the apparatus used in the present invention. A synthetic organic polymer from source 1 is passed into chamber 2 wherein it is heated by means not shown, to the molten state. From chamber 2 the molten polymer is forced by screw feed 3 through tubular feeding means 4 out through orifice 5 and onto the internal concave face of conoid disc 6. Screw feed 3 serves to apply continuous uniform pressure to the molten polymer in tubular feeding means 4. As shown in FIGURE 3 disc 6 has an aperture 7 located centrally therein and terminates in a sharp edged periphery 6(c). In a preferred embodiment of this invention disc 6 has an annular recessed portion 8 located within the aperture 7 and surrounding the tubular feeding means 4. This recessed portion serves as a reservoir for incoming molten polymer. The use of this annular recessed portion 8 insures more even distribution of the molten polymer over the internal concave face of disc 6. The disc 6 is rotatably mounted in casing 9 and rotated by chain drive 10. In order to produce uniform fine fibers by the apparatus of the present invention, the disc should be capable of rotating about a substantially horizontal axis at speeds between 1000 r.p.m. and 7000 r.p.m., preferably between 2000 and 4000 r.p.m. Tubular feeding means 4 is surrounded by heating means 11 which serves to maintain the polymer in the molten state while it passes through the feeding means. Opposite the concave surface of disc 6 are located additional heating means 12, which are preferably radiant heaters, and serve to maintain the disc temperature above the melting point of the polymer. Insulation means 13 surround the radiant heaters 12.

Behind the convex surface of disc 6 there is located annular opening 14, which is open to the atmosphere and allows atmospheric air to be drawn into cylindrical enclosure 15. The cylindrical enclosure 15 is reinforced with collar 16. Since disc 6 rotates about a substantially horizontal axis, enclosure 15 must be substantially horizontally disposed as illustrated in the drawing. As the molten polymer is introduced through aperture 7 onto the internal, concave surface of disc 6, the centrifugal force resulting from the rotation of the disc causes the molten polymer to substantially cover the concave surface and to be discharged from the periphery of disc 6 and solidify into fine fibers. The fiber stream then passes through enclosure 15 onto fiber gathering means 17. Gathering means 17 is preferably a moving screen in the form of an endless belt mounted on rotating means 18. Between the two sides of the rotating screen there is located frame 19 which serves to direct the gas stream into vacuum means 22. The mat of fine fibers 20 may easily be removed from moving screen 17 and wound on a take-up roll 21. Vacuum means 22 serves to draw atmospheric air into enclosure 15 through annular opening 14. This pulling action on the polymer being discharged from the periphery of rotating disc 6 allows for attenuation of the molten polymer drops prior to their solidification thus eliminating the formation of beads or globules. Furthermore, heating means 12 prevents the solidification of any of the polymer on the rotating disc 6 and the sharp edged periphery 6(a) serves to discharge molten elongated droplets in a generally uniform size.

While FIGURE 1 shows the removal of the fibers from the gathering means in the form of a mat, it is also possible, and in some cases desirable, to remove the fibers in the form of a yarn. This may be done by the apparatus shown in FIGURE 2 wherein air jets 23 serve to decrease the width of mat 20 as it passes over roll 21. The fibers are further compacted by passage through guide 24 and are passed over roll 25 and through guide 24(a). The yarn 26 is thence taken up on bobbin 27.

In FIGURE 3 the rotating disc 6 is shown as comprising tubular neck portion 6(a) and conoid discharge portion 6(b) flaring outwardly therefrom with aperture 7 located centrally therein. Disc 6 terminates with a sharp edge 6(c). While it is preferred that the rotating disc be cone-shaped, it will be understood that other conoid discs may be used as long as they allow for an even uniform distribution of the polymer over the internal concave face thereof. Thus, saucer-shaped discs and other like conoid discs may be equally well employed.

It has been found that the concentricity of the disc is an important factor in the successful operation of the apparatus. That is, the peripheral edge of disc 6 must be substantially completely concentric with its axis of rotation and with the periphery of aperture 7. When disc 6 is out-of-round to any substantial degree, the polymer melt does not discharge evenly over its entire peripheral surface and globule formation results.

Any synthetic organic polymer that is melt spinnable may be used in the apparatus of the present invention. Thus, in accordance with the present invention, fibers may be made from polyamides, polyesters, polycarbonates, polyurethanes, polyvinyl chloride, polyvinyl alcohol, polystyrene and other like polymers which are melt spinnable. Likewise, mixtures of fibers may be spun in accordance with the present invention either by admixing the melts prior to their introduction through feeding means 4, by having a plurality of feeding means through the aperture of the conoid disc or by having a plurality of discs on the same shaft.

As shown in the drawing, the vacuum means 22 pulling atmospheric air into the enclosure 15 through opening 14, is the sole means to transport fibers coming off disc 6 to gathering means 17. It is obviously necessary that the atmospheric air entering through annular opening 14 must be traveling at a velocity sufficient to overcome the centrifugal force of the rotating cone and entrain the polymer fibers through cylindrical enclosure 15 and onto gathering means 17. It has been found necessary for this purpose to employ a vacuum sufficient to pull in the atmospheric air at a rate of between 1500 feet per minute and 6000 feet per minute.

Since in many cases it is highly desirable to observe the collection of fibers from the incoming air stream onto the moving screen, it is preferred that enclosure 15 be transparent, that is, the enclosure may be made of a transparent material or it may contain transparent viewing windows.

Fibers made in accordance with the apparatus of the present invention are essentially uniform in shape and size. Bead formation is essentially eliminated and the diameters of the fibers range from about 5 microns to about 0.1 micron with the average diameter being between 1 and 2 microns. The fibers produced by the present invention have outstanding properties which make them useful for paper products, laminates, absorbent pads, filters, insulation materials and the like.

I claim:

1. Apparatus for producing fine fibers of a synthetic organic polymer comprising a substantially horizontally disposed, substantially cylindrical-shaped enclosure, a conoid disc rotatably mounted in one end of said enclosure, said disc having a convex surface and a concave surface, said concave surface facing into said enclosure, means to rotate said disc about a substantially horizontal axis, an aperture located centrally in said disc, tubular feeding means extending outwardly from said convex surface and adapted to supply molten polymer through said aperture and onto the concave surface of said disc, pressure means adapted to apply pressure to the polymer contained in said feeding means, heating means adapted to heat said convex surface to a temperature above the melting point of said polymer, an annular opening in said enclosure located on the convex side of said disc and surrounding the periphery of said disc, vacuum means located at the end of said enclosure opposite said disc adapted to establish a vacuum within said enclosure sufficient to pull atmospheric air through said annular opening at a rate of between 1500 and 6000 feet per minute, and gathering means located in said enclosure between said vacuum means and said disc and adapted to remove fibers from said zone, said vacuum means being the sole means to transport fibers from said disc to said gathering means.

2. The apparatus as described in claim 1 wherein said heating means comprise radiant heaters.

3. The apparatus as described in claim 1 wherein said disc is cone-shaped.

4. The apparatus as described in claim 1 wherein said gathering means comprises a movable screen, and comprising additional means to move said screen in a direction perpendicular to the axis of rotation of said disc and means to remove fibers from said screen.

5. The apparatus as described in claim 1 wherein said concave surface is substantially uniform and terminates in a sharp edged periphery.

6. The apparatus as described in claim 1 comprising additionally means to heat said tubular feeding means.

7. Apparatus for producing fine fibers of a synthetic organic polymer comprising a substantially horizontally disposed substantially cylindrical-shaped enclosure, a conoid disc rotatably mounted in one end of said enclosure, said disc having a convex surface and a concave surface, said concave surface facing into said enclosure, means to rotate said disc about a substantially horizontal axis, an aperture located centrally in said disc, tubular feeding means extending outwardly from said convex surface and adapted to supply molten polymer through said aperture and onto the concave surface of said disc, an annular recessed portion located within the periphery of said aperture surrounding said feeding means and adapted to receive polymer from said feeding means, pressure means adapted to apply pressure to the polymer contained in said feeding means, means adapted to heat said feeding means, radiant heating means adapted to heat said convex surface to a temperature above the melting point of said polymer, an annular opening in said enclosure located on the convex side of said disc and surrounding the periphery of said disc, vacuum means located at the end of said enclosure opposite said disc adapted to establish a vacuum within said enclosure sufficient to pull atmospheric air through said annular opening at a rate of between 1500 and 6000 feet per minute, gathering means located in said enclosure between said vacuum means and said disc and adapted to remove fibers from said zone, and means adapted to remove fibers from said gathering means, said vacuum means being the sole means to transport fibers from said disc to said gathering means.

8. The apparatus as described in claim 7 wherein the conoid disc comprises a tubular neck portion and a conoid discharge surface flaring outwardly therefrom.

9. The apparatus as described in claim 7 wherein the means adapted to remove fibers from said gathering means includes means to remove the fibers in the form of a yarn.

References Cited by the Examiner

UNITED STATES PATENTS

| | | | |
|---|---|---|---|
| 2,132,702 | 11/1938 | Simpson | 65—9 X |
| 2,192,944 | 3/1940 | Thomas | 18—26 X |
| 2,328,714 | 9/1943 | Drill et al. | 18—26 X |
| 2,994,915 | 8/1961 | Duncan | 65—15 X |
| 3,097,085 | 7/1963 | Wallsten | 18—26 X |

WILLIAM J. STEPHENSON, *Primary Examiner.*